US012793721B2

(12) United States Patent
Bruhn

(10) Patent No.: US 12,793,721 B2
(45) Date of Patent: Nov. 10, 2026

(54) METHODS AND DEVICES FOR CODING OR DECODING OF SCENE-BASED IMMERSIVE AUDIO CONTENT

(71) Applicant: DOLBY INTERNATIONAL AB, Dublin (IE)

(72) Inventor: Stefan Bruhn, Sollentuna (SE)

(73) Assignee: DOLBY INTERNATIONAL AB, Dublin (IE)

( * ) Notice: Subject to any disclaimer, the term of this patent is extended or adjusted under 35 U.S.C. 154(b) by 153 days.

(21) Appl. No.: 18/713,630

(22) PCT Filed: Nov. 30, 2022

(86) PCT No.: PCT/EP2022/083824
§ 371 (c)(1),
(2) Date: May 24, 2024

(87) PCT Pub. No.: WO2023/099551
PCT Pub. Date: Jun. 8, 2023

(65) Prior Publication Data

US 2025/0140267 A1 May 1, 2025

Related U.S. Application Data

(60) Provisional application No. 63/410,587, filed on Sep. 27, 2022, provisional application No. 63/284,198, filed on Nov. 30, 2021.

(51) Int. Cl.
*G10L 19/008* (2013.01)

(52) U.S. Cl.
CPC .................................. *G10L 19/008* (2013.01)

(58) Field of Classification Search
CPC ..... G10L 19/008; G10L 19/167; G10L 19/18; H04S 3/008; H04S 2420/11
See application file for complete search history.

(56) References Cited

U.S. PATENT DOCUMENTS 8,891,797 B2 11/2014 Thiergart
9,196,257 B2 11/2015 Schultz-Amling
(Continued)

FOREIGN PATENT DOCUMENTS

EP 3724876 B1 5/2022
RU 2679571 C1 2/2019
(Continued)

OTHER PUBLICATIONS

ETSI TS 126 253 V18.2.0, LTE, 5G, Codec for Immersive Voice and Audio Services (IVAS), Detailed Algorithmic Description including RTP payload format and SDP parameter definitions, 3GPP TS 26.253 version 18.2.0 Release 18, Oct. 2024, 855 Pages.
(Continued)

*Primary Examiner* — Stella L. Woo

(57) ABSTRACT

The application provides a method (500) for encoding an Ambisonics input audio signal. The method (500) comprises providing (501) the input audio signal to a SPAR encoder and to a DirAC analyzer and parameter encoder. Furthermore, the method (500) comprises generating (502) an encoder bit stream based on output of the SPAR encoder and based on output of the DirAC analyzer and parameter encoder. The application also provides a method for decoding the encoder bitstream by generating an intermediate Ambisonics signal using a SPAR decoder based on the encoder bitstream and processing the intermediate Ambisonics signal using a DirAC synthesizer to provide an output audio signal for rendering. The DirAC synthesizer may use DirAC parameters of the bitstreams or DirAC parameters obtained by analyzing the intermediate Ambisonics signal.

1 Claim, 5 Drawing Sheets

(56) References Cited

U.S. PATENT DOCUMENTS

Figure 1:
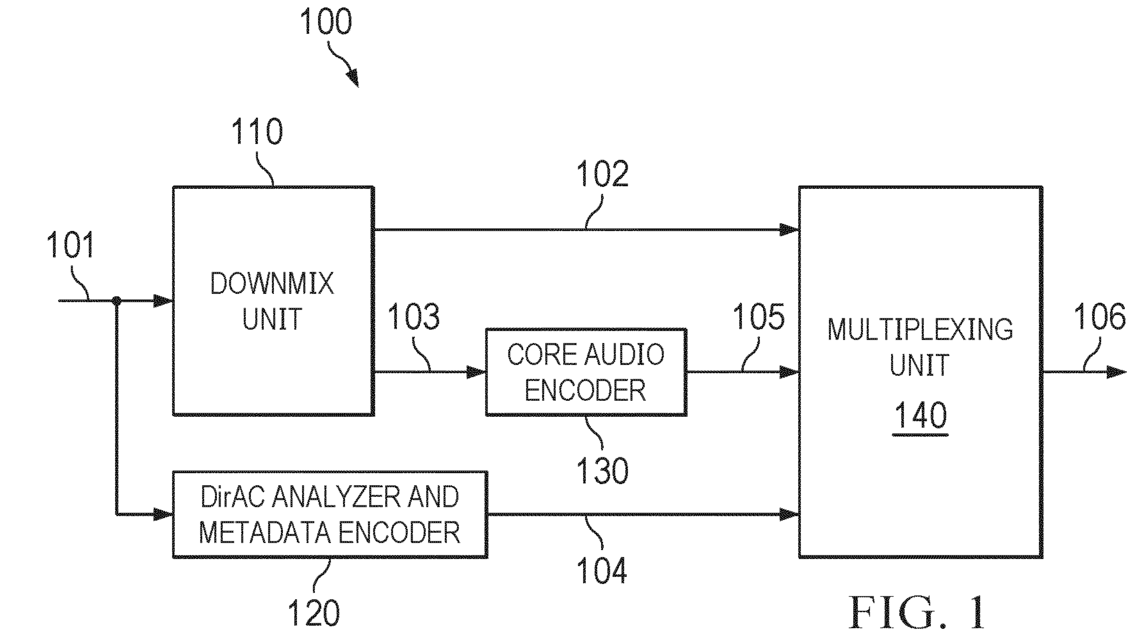

| | | | | |
|---|---|---|---|---|
| 9,609,452 | B2 | 3/2017 | Peters | |
| 9,922,656 | B2 | 3/2018 | Peters | |
| 10,349,067 | B2 | 7/2019 | Hendry | |
| 2012/0057710 | A1 | 3/2012 | Disch | |
| 2017/0164131 | A1 | 6/2017 | Krueger | |
| 2018/0096692 | A1 | 4/2018 | Purnhagen | |
| 2020/0105282 | A1 | 4/2020 | Kim | |
| 2020/0221230 | A1 | 7/2020 | Fuchs | |
| 2020/0273473 | A1 | 8/2020 | Fuchs | |
| 2020/0357421 | A1* | 11/2020 | Fuchs | G10L 19/008 |
| 2021/0050022 | A1 | 2/2021 | Kjoerling | |
| 2021/0098004 | A1* | 4/2021 | Sen | H04S 3/008 |
| 2021/0166708 | A1 | 6/2021 | Mcgrath | |
| 2023/0215445 | A1* | 7/2023 | Eckert | G10L 19/008<br>704/500 |
| 2023/0343346 | A1* | 10/2023 | Mcgrath | G10L 19/008 |

FOREIGN PATENT DOCUMENTS

| | | | |
|---|---|---|---|
| WO | 2012025512 | A1 | 3/2012 |
| WO | 2020089510 | A1 | 5/2020 |
| WO | 2021022087 | A1 | 2/2021 |

OTHER PUBLICATIONS

Jukka Ahonen, et al. "Directional analysis of sound field with linear microphone array and applications in sound reproduction", 124th AES Convention, Amsterdam, The Netherlands, May 17-20, 2008, 11 Pages.

Mcgrath D et al: "Immersive Audio Coding for Virtual Reality Using a Metadata-assisted Extension of the 3GPP EVS Codec", ICASSP 2019—2019 IEEE International Conference on Acoustics, Speech and Signal Processing (ICASSP), IEEE, May 12, 2019, pp. 730-734, 5 Pages.

Ville Pulkki, et al., "Directional audio coding-perception-based reproduction of spatial sound", International Workshop on the principles and applications of spatial hearing, Nov. 11-13, 2009, 4 Pages.

* cited by examiner

METHODS AND DEVICES FOR CODING OR DECODING OF SCENE-BASED IMMERSIVE AUDIO CONTENT

CROSS-REFERENCE TO RELATED APPLICATIONS

This application is a National Phase entry of PCT Application No. PCT/EP2022/083824 filed Nov. 30, 2022, which claims priority from U.S. Provisional Application No. 63/284,198, filed 30 Nov. 2021, and U.S. Provisional Application No. 63/410,587, filed 27 Sep. 2022.

TECHNICAL FIELD

The present document relates to methods and corresponding devices for processing audio, in particular for coding immersive audio content.

BACKGROUND

The sound or soundfield within the listening environment of a listener that is placed at a listening position may be described using an Ambisonics audio signal, in particular a first order Ambisonics signal (FOA) or a higher order Ambisonics signal (HOA). The Ambisonics signal may be viewed as a multi-channel audio signal, with each channel corresponding to a particular directivity pattern of the soundfield at the listening position of the listener. An Ambisonics signal may be described using a three-dimensional (3D) cartesian coordinate system, with the origin of the coordinate system corresponding to the listening position, the x-axis pointing to the front, the y-axis pointing to the left and the z-axis pointing up.

The present document addresses the technical problem of enabling a particularly efficient and flexible coding of a Ambisonics audio signals. The technical problem is solved by each one of the independent claims. Preferred examples are described in the dependent claims.

SUMMARY

According to an aspect, a method for encoding an Ambisonics input audio signal is described. The method comprises providing the input audio signal to a spatial reconstruction (SPAR) encoder and to a directional audio coding (DirAC) analyzer and parameter encoder. Furthermore, the method comprises generating an encoder bit stream based on an output of the SPAR encoder and based on an output of the DirAC analyzer and parameter encoder.

According to another aspect, a method for decoding an encoder bit stream which is indicative of an Ambisonics input audio signal is described. The method comprises generating an intermediate Ambisonics signal using a spatial reconstruction (SPAR) decoder based on the encoder bit stream. Furthermore, the method comprises processing the intermediate Ambisonics signal using a directional audio coding (DirAC) synthesizer to provide an output audio signal for rendering.

It should be noted that the methods described herein can each be implemented in software and/or computer readable code on one or more processors, in whole or in part of the respective methods.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, a system comprising one or more processors is described. The system further comprises a non-transitory computer-readable medium storing instructions that, upon execution by the one or more processors, cause the one or more processors to perform operations of one or more of the methods described herein.

According to a further aspect, a non-transitory computer-readable medium is described, which stores instructions that, upon execution by one or more processors, cause the one or more processors to perform operations of one or more of the methods described herein.

According to another aspect, an encoding device for encoding an Ambisonics input audio signal is described. The encoding device is configured to provide the input audio signal to a spatial reconstruction (SPAR) encoder and to a directional audio coding (DirAC) analyzer and parameter encoder. The encoding device is further configured to generate an encoder bit stream based on output of the SPAR encoder and based on output of the DirAC analyzer and parameter encoder.

According to a further aspect, a decoding device for decoding an encoder bit stream which is indicative of an Ambisonics input audio signal is described. The decoding device is configured to generate an intermediate Ambisonics signal using a spatial reconstruction (SPAR) decoder based on the encoder bit stream. Furthermore, the decoding device is configured to process the intermediate Ambisonics signal using a directional audio coding (DirAC) synthesizer to provide an output audio signal for rendering.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Figure 2:
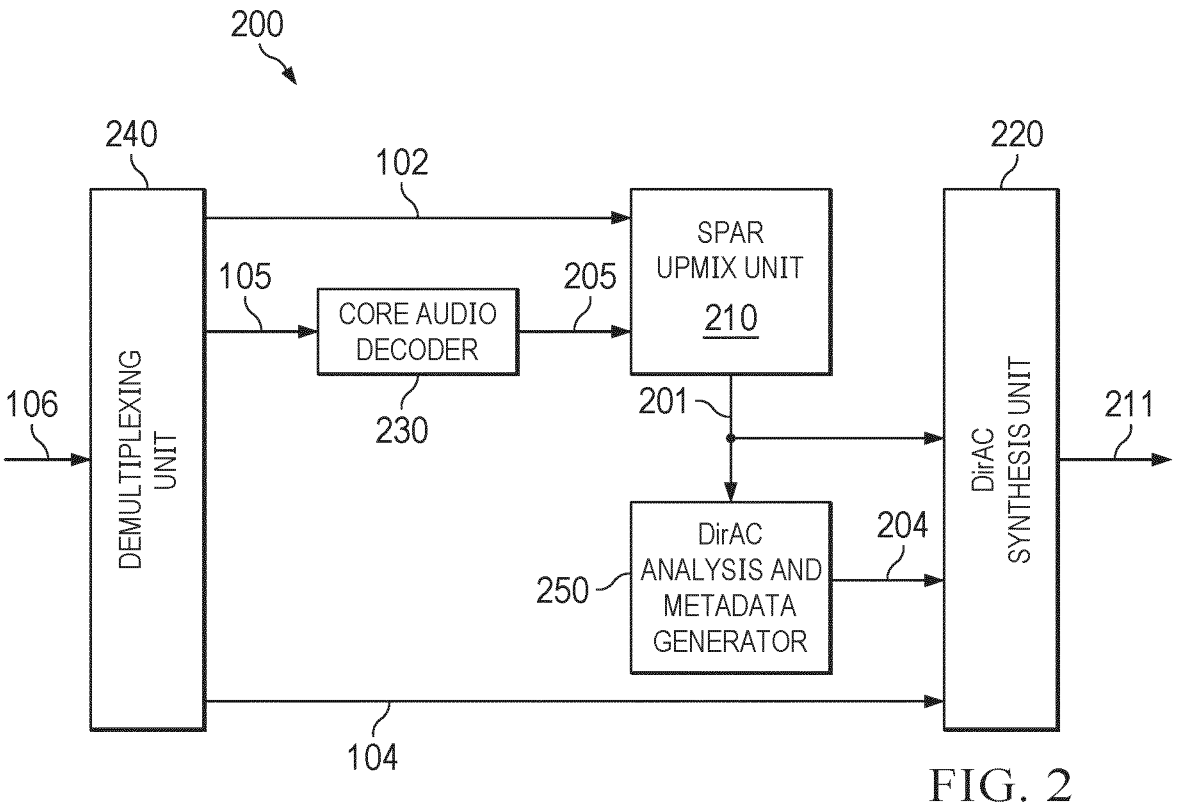
Figure 3A:
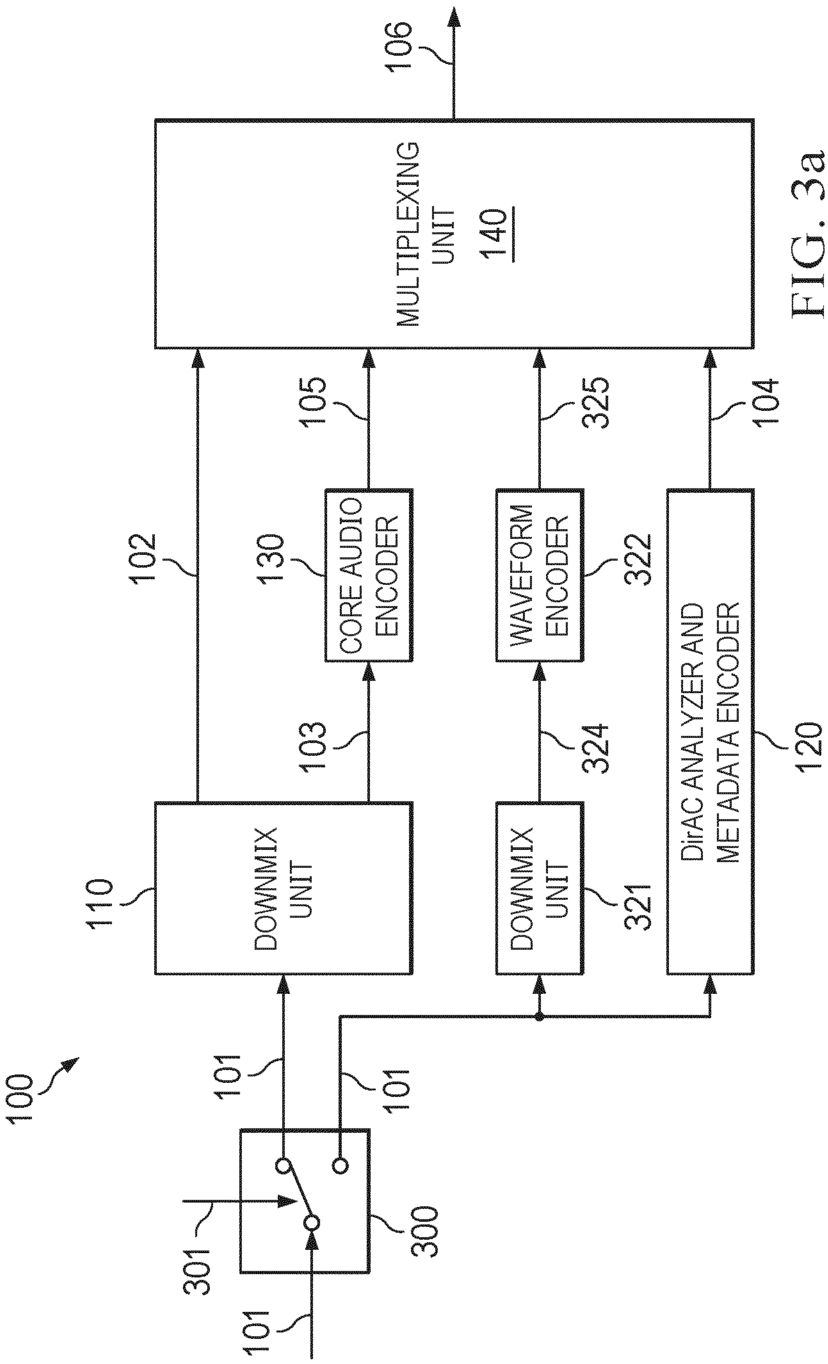
Figure 3B:
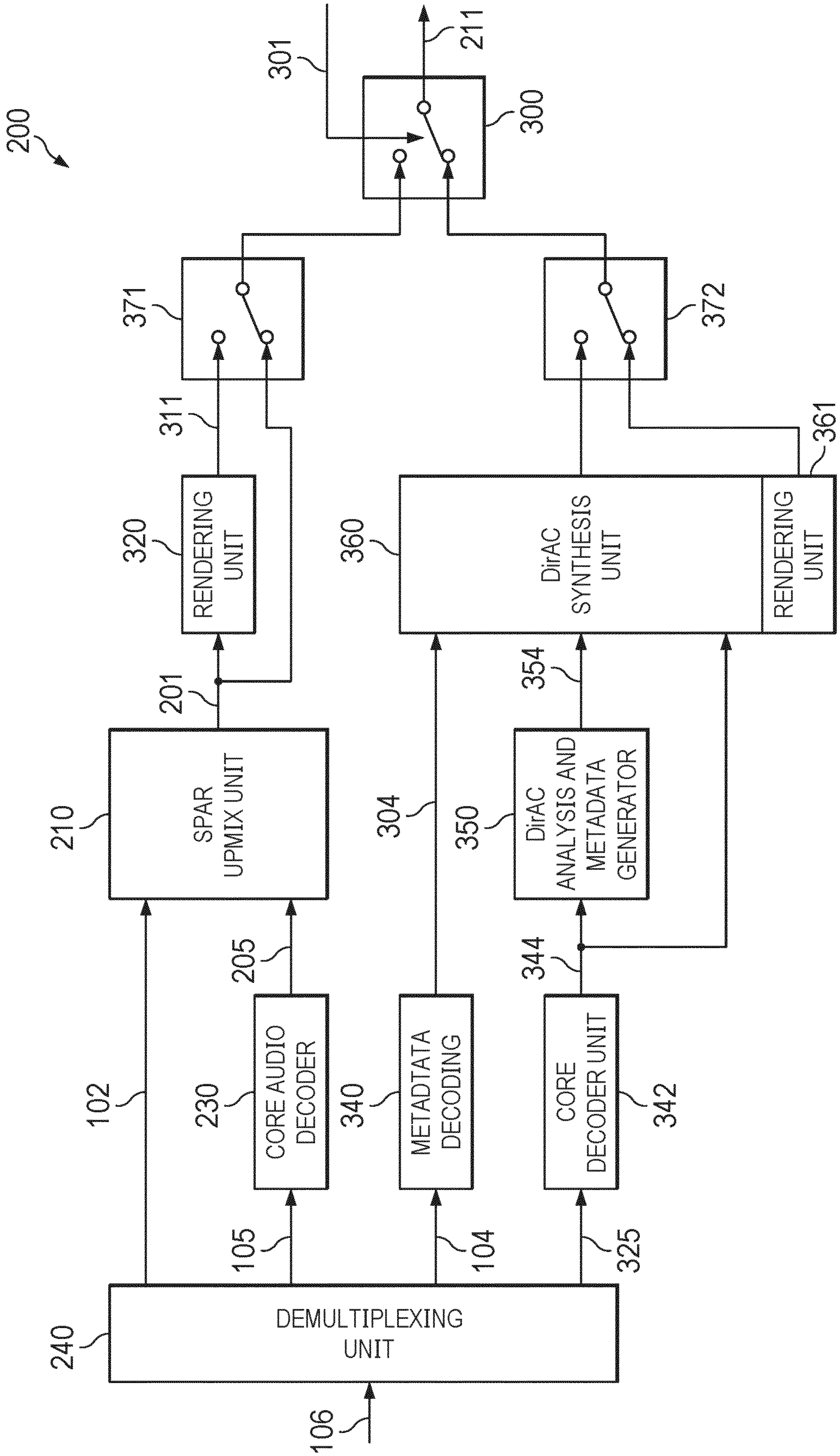
Figure 4:
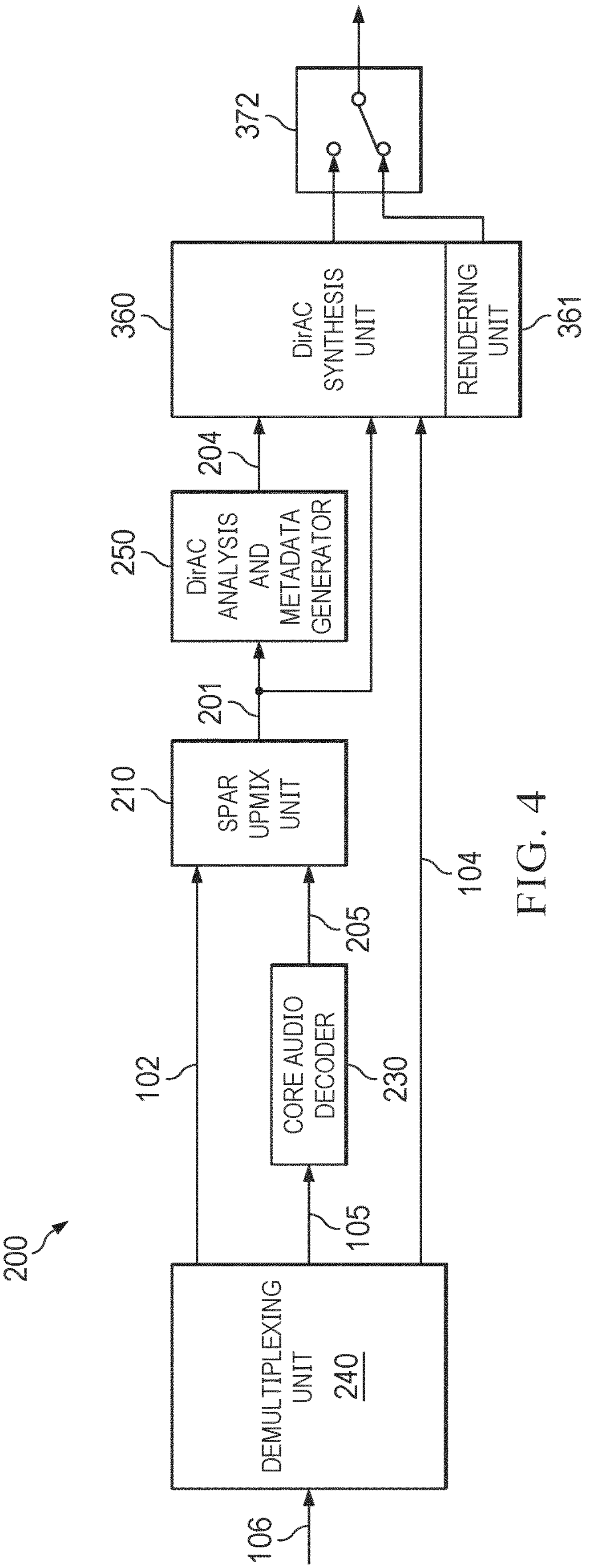
Figure 5A:
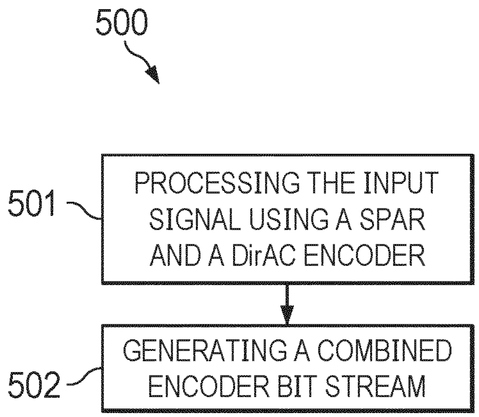
Figure 5B:
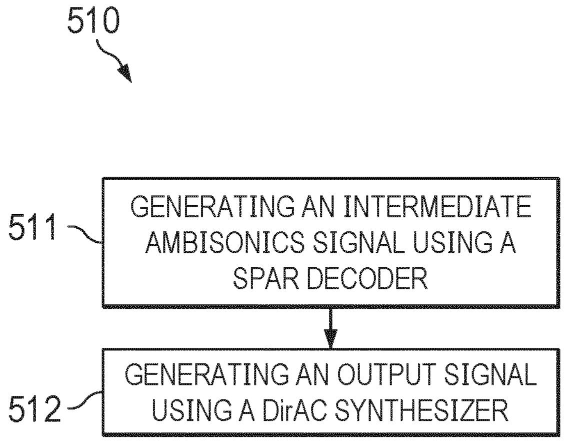

The invention is explained below in an exemplary manner with reference to the accompanying drawings, wherein FIG. 1 shows an example audio encoder;

FIG. 2 shows an example audio decoder;

FIGS. 3*a* and 3*b* show an example audio encoder and audio decoder, respectively;

FIG. 4 shows an example audio encoder;

FIG. 5*a* shows a flow chart of an example method for encoding an ambisonics audio signal; and FIG. 5*b* shows a flow chart of an example method for decoding a bit stream which is indicative of an ambisonics audio signal.

DETAILED DESCRIPTION

As indicated above, the present document relates to the efficient and flexible encoding of ambisonics audio signals.

An example coding scheme for ambisonics signals is the so-called SPAR (spatial reconstruction) scheme, which is described e.g., in McGrath et al., "Immersive Audio Coding for Virtual Reality Using a Metadata-assisted Extension of the 3GPP EVS Codec," ICASSP 2019-2019 IEEE International Conference on Acoustics, Speech and Signal Processing (ICASSP), 2019, pp. 730-734, doi: 10.1109/ICASSP.2019.8683712, the content of which is incorporated herein by reference in its entirety. A further coding scheme is the so-called Directional Audio Coding (DirAC) scheme, which is described e.g., in Ahonen, Jukka, et al. "Directional analysis of sound field with linear microphone array and applications in sound reproduction." Audio Engineering Society Convention 124. Audio Engineering Society, 2008, and/or in V. Pulkki et al, "Directional audio coding-perception-based reproduction of spatial sound", International Workshop on the principles and applications of spatial hearing, Nov. 11-13,2009, Zao, Miyagi, Japan, the content of which is incorporated herein by reference in its entirety.

In SPAR, an Ambisonics (FOA or HOA) audio signal may be spatially processed during downmixing such that one or more downmix channels are waveform encoded and some channels are parametrically encoded based on metadata determined by a SPAR encoder. The SPAR decoder carries out the inverse operation in that it upmixes the one or more received (and decoded) downmix channels with help of the SPAR metadata to reconstruct the original Ambisonics channels. SPAR operates typically on a plurality of different time/frequency (T/F) tiles.

Directional Audio Coding (DirAC) is a parametric coding method based on direction of arrival (DoA) and diffuseness per T/F tile (i.e., for the plurality of different T/F tiles). DirAC is generally agnostic to the input audio format but can be used on Ambisonics audio, meaning that the DirAC parameter analysis can be based on an Ambisonics (FOA or HOA) input audio signal and that the DirAC decoder may reconstruct an Ambisonics signal. A property of DirAC is that DirAC may be adapted to generate directly a binaurally rendered output signal based on a number of received signals (transport channels) and based on DirAC metadata. DirAC metadata generation may partially or fully reside at the decoding end and e.g., operate on transmitted and received FOA or HOA transport channels (as outlined in the present document). Furthermore, DirAC may be used to recover Ambisonics audio at higher order than originally input into the coding system and may thus be used e.g., to enhance the spatial resolution of the output signal compared to the spatial resolution of the input audio signal.

SPAR is an efficient coding method, which allows an Ambisonics signal to be stored and/or transmitted at relatively low bit rates. For high-quality demands, SPAR may be used to efficiently represent HOA signals (e.g., of order L=3 or more) while using only a relatively low number of downmix channel signals (e.g., 4 or less). However, SPAR does not provide solutions for recovering and/or generating an Ambisonics output signal at an increased Ambisonics order from a lower order Ambisonics input audio signal. E.g., if the input audio signal is FOA (L=1), it is typically not possible to recover and/or generate an HOA2 (L=2) or HOA3 (L=3) signal. In that case, SPAR typically only allows to reconstruct the FOA input audio signal with relatively high quality at a given bit rate.

DirAC is an efficient coding method having strengths which vary depending on the requirements on the coding system. If, for instance, the requirement is to recover an input Ambisonics signal of a given order L (FOA or HOA) with the highest possible fidelity after decoding, it has been observed that the coding efficiency of DirAC is generally inferior compared to SPAR. It has also been observed that the quality of DirAC audio reconstruction saturates at relatively high bit rates and that DirAC does not provide a native solution to obtain a transparent audio quality at relatively high bit rates. In order to address this issue, a coding system relying on DirAC may (at relatively high bit rates) transmit all input channels (e.g., 4 in case of FOA) as transport channels and may deactivate parametric reconstruction using DirAC. This impacts the efficiency of DirAC (compared to SPAR) and leads to a relatively high complexity (with regards to numerical and memory resources), since a relatively high number of transport channels has to be encoded using waveform coding (compared to the number of downmix channels which are encoded within a SPAR coding system).

In the present document, a coding scheme is described that combines the strengths of SPAR and DirAC coding systems in an optimized manner. SPAR and DirAC may be combined such that the combined decoder reconstructs a first set of Ambisonics upmix signals based on received and decoded SPAR downmix signals and SPAR metadata (using a SPAR decoder). The reconstructed SPAR upmix signal (referred to herein as an intermediate Ambisonics signal) may then be fed into a DirAC decoder in order to operate on the set of SPAR upmix signals using DirAC metadata (e.g., to generate an output signal at an increased Ambisonics order).

FIG. 1 shows an example encoding device (also referred to as an encoder or encoding unit) 100 and FIGS. 2 and 4 show an example decoding device (also referred to as a decoder or decoding unit) 200. SPAR and DirAC are operated in a parallel structure within the encoding device 100 and are operated in a serial structure within the decoding device 200. As an example (without limitation), it may be assumed that the input audio signal 101 is an FOA signal and that the codec (coding/decoding) system 100, 200 operates on frames of 20 ms length.

In the encoding device 100, a frame of the input audio signal 101 may be fed to the SPAR encoder 110, 130 (which may comprise a downmix unit 110 and a core audio encoder 130) and to the optional DirAC analyzer and parameter encoder 120. Each of these units 110, 120, 130 generates a respective partial bit stream 102, 104, 105, respectively. The SPAR encoder 110, 130, in particular a downmix unit 110 of the SPAR encoder 110, 130, generates a SPAR metadata bit stream (or SPAR metadata) 102 and a set of (one or more) SPAR downmix channel signals 103. The one or more SPAR downmix channel signals 103 are fed into a core audio encoder 130 that is configured to represent these signals 103 using a core audio bit stream 105.

The core audio encoder 130 of the SPAR encoder 110, 130 may be configured to perform waveform encoding of the one or more downmix channel signals 103, thereby providing the core audio bit stream 105. Each of the downmix channel signals 103 may be encoded using a mono waveform encoder (e.g., 3GPP EVS encoding), thereby enabling an efficient encoding. Further examples for encoding the one or more downmix channel signals 103 are MPEG AAC, MPEG HE-AAC and other MPEG Audio codecs, 3GPP codecs, and Dolby Digital/Dolby Digital Plus (AC-3, eAC-3). It is notable that both SPAR and DirAC are spatial audio coding frameworks that can operate with various different core audio codecs that represent the downmix or transport channels, respectively. SPAR and DirAC represent the spatial audio information by means of their respective SPAR or DirAC metadata.

The optional DirAC analyzer and metadata encoder 120 generates an optional DirAC metadata bit stream (or DirAC metadata) 104. In contrast to a conventional DirAC encoder for FOA, the encoding device 100 does not comprise a DirAC transport channel generator or downmixer (as this information is provided by the SPAR encoder 110, 130). The partial bit streams 102, 104, 105 are multiplexed into a common encoder bit stream 106 (within the multiplexing unit 140), which may be transmitted to a decoding device 200.

At the decoding device 200, the received (encoder) bit stream 106 may be demultiplexed (within demultiplexing unit 240) into partial bit streams 102, 104, 105, notably the SPAR metadata bit stream 102, the core audio bit stream 105 and the (optional) DirAC metadata bit stream 104. The core audio bit stream 105 is fed into the core audio decoder 230 that reconstructs the one or more SPAR downmix channel signals 205. These one or more reconstructed downmix channel signals 205 are fed along with the SPAR metadata bit stream 102 into the SPAR upmix unit 210. The SPAR upmix unit 210 upmixes the one or more reconstructed downmix channel signals 205 to provide a reconstruction 201 of at least a subset of the channels of the original Ambisonics signal 101 (which may be referred to as the intermediate Ambisonics signal 101). This intermediate Ambisonics signal 201 is typically only an approximation of the original Ambisonics input audio signal 101 of the encoding device 100. The Ambisonics order L of the intermediate Ambisonics signal 201 is generally identical or not greater than the Ambisonics order of the original input audio signal 101.

This intermediate Ambisonics signal 201 may be fed into the DirAC analysis and metadata generator unit 250 at the decoding device 200. This optional DirAC analysis and metadata generator unit 250 may carry out DirAC analysis and metadata generation based on the SPAR-reconstructed intermediate Ambisonics signal 201. The optional (auxiliary) DirAC metadata 204 from the DirAC analysis and metadata generator unit 250 (referred to as auxiliary DirAC metadata 204), the optional DirAC metadata bit stream 104 received from the encoding device 100 and the SPAR-reconstructed intermediate Ambisonics signal 201 may be fed into the DirAC synthesis unit 220. This DirAC synthesis unit 220 may decode the received metadata bit stream 104. Subsequently, DirAC signal synthesis may be performed on the SPAR-reconstructed intermediate Ambisonics signals 201 using the available DirAC metadata 104, 204. The DirAC synthesis unit 220 may be configured to synthesize an output Ambisonics signal 211 of higher order (compared to the input audio signal 101) or to synthesize (render) a binaural output signal 211 or to synthesize (render) a multi-loudspeaker output signal 211.

As illustrated in FIGS. 1, 2 and 4, DirAC analysis may optionally be performed at the encoding device 100 (within DirAC analyzer and metadata encoder 120) and/or at the decoding device 200 (within the DirAC analysis and metadata generator unit 250). DirAC analysis and metadata encoding may be performed at the encoding device 100, if the transport channel signals (i.e., the one or more downmix channel signals 103 and/or the intermediate Ambisonics signal 201)) are unsuitable for carrying out DirAC analysis after. decoding at the decoding device 200. This may be the case, if the decoded transport channel signals are only single (mono) or stereo audio signals but not Ambisonics signals. In such a situation, the Direction of Arrival (DOA) analysis for all spherical or at least cylindric directions (which is typically performed within a DirAC analysis unit 120, 250) cannot be performed. This may also be the case for certain frequency bands of a transmitted Ambisonics signal in case a parametric coding method is used within the core audio encoder 130 (e.g., bandwidth extension, spectral band replication (SBR), etc.) which renders DOA analysis impossible or unreliable for certain frequency bands. The benefit of combining DirAC with SPAR as outlined in the present document is that in any case a decoded intermediate Ambisonics signal 201 is available for decoder-side DirAC analysis (within the DirAC analysis and metadata generator unit 250).

An aspect of SPAR and DirAC coding is that both methods operate on frequency bands (subbands) and on frames or subframes, i.e., on T/F tiles. Implementations of these methods may use operations in the time domain on subbands, in the QMF domain or in the frequency domain on, e.g., (Modified) DFT frequency bins or groups of such bins. All aspects described herein are thus applicable for any T/F tile. Furthermore, the terms subbands, frequency bands/bins or QMF bands/bins are interchangeable in the context of the present document. Likewise, the terms subband domain, QMF domain or frequency domain are interchangeable in the context of the present document.

In combining SPAR and DirAC coding, it may turn out that particular T/F tiles or subbands benefit more from performing an DirAC analysis based on the SPAR decoded intermediate Ambisonics signal 201 (within the DirAC analysis and metadata generator unit 250), while for others it may be beneficial to make such analysis at the encoding device 100 (within the DirAC analyzer and metadata encoder 120) and to transmit the corresponding metadata bit stream 104 to the decoding device 200. Typically, DirAC parameter analysis is more reliable at the encoding device 100, since it can be based on the original input audio signal 101. However, in this case corresponding metadata bit stream 104 needs to be encoded and transmitted. When assuming a certain total bit rate budget, the partial bit rate of the DirAC metadata bit stream 104 is at the expense of the bit rates available for the SPAR metadata bit stream 102 and the core audio bit stream 105. Hence, at least for one or more selected T/F tiles or subbands, it may be more beneficial for the performance of the overall coding system to base DirAC analysis on the corresponding SPAR decoded T/F tile or subband signal of the intermediate Ambisonics signal 201 (at the decoding device 200).

Whether to select DirAC parameter analysis for a given subband or T/F tile on the encoder-side or on the decoder-side (in order to achieve an optimal coding system) may depend on one or more properties of the one or more core audio coded SPAR downmix channel signals 103 and in turn on the suitability of the reconstructed intermediate Ambisonics signal 201 after upmix in the upmix unit 210 of the SPAR decoder 210, 230 for carrying out DirAC parameter analysis (within the DirAC analysis and metadata generator unit 250). It has been observed that subbands and time frames for which the coding is waveform-preserving are generally more suitable for DirAC parameter analysis at the decoding device 200 (within the DirAC analysis and metadata generator unit 250) than subbands and time frames for which the coding is not waveform-preserving. This is typically the case for lower frequency bands and/or for time/frequency signal portions that are more tonal rather than noise-like. Hence, the codec system 100, 200 may be configured to perform DirAC parameter analysis (within the DirAC analyzer and metadata encoder 120) at the encoder-side for high frequency bands and/or for noise-like time/frequency signal portions. On the other hand, the codec system 100, 200 may be configured to perform DirAC parameter analysis at the decoder-side (within the DirAC analysis and metadata generator unit 250) for low frequency bands and/or for tonal time/frequency signal portions.

Hence, the combined SPAR and DirAC coding/decoding system 100, 200 may comprise adaptation means that adaptively switch between DirAC metadata transmission from the encoding device 100 and DirAC analysis carried out in the decoding device 200 for selective T/F tiles, subbands and/or frames. The adaptation may for example depend on one or more detected properties of the input audio signal 101, such as tonality or noisiness.

The combined SPAR and DirAC encoding/decoding system 100, 200 may comprise a decoding device 200 which operates on a modified number of SPAR upmix channels that are fed into the subsequent DirAC units 220, 250. A SPAR system typically upmixes to an Ambisonics signal, meaning that it produces $(L+1)^2$ upmix channels for a given Ambisonics order L. Notably for relatively low bit rate operation (at e.g., <64 kbps), the SPAR decoding and upmix operation (within the upmix unit 210) may at least for certain T/F tiles or frequency bands lead to relatively poor signal quality. This may have an impact on the subsequent DirAC operations, which in turn may affect the quality of the audio output signal 211 of the encoding/decoding system 100, 200.

This issue may be addressed by modifying SPAR such that the number of upmix channel signals (subsequent to upmixing in the upmix unit 210) is reduced (at least for certain T/F tiles or frequency bands). As an example, for an FOA input audio signal 101, it is possible to modify SPAR such that it produces only a single upmix channel or two upmix channels, corresponding to the decoded B-format FOA component signals W or, respectively, W and Y, for at least certain T/F tiles or frequency bands. This modification of SPAR may be achieved by setting the respective upmix coefficients (within the SPAR metadata) for the discarded channels (Y, Z, X, respectively Z, X) to 0 and/or, in the 2-channel example, by not carrying out prediction from W to Y, which results in the transmitted prediction residual signal Y' to be identical to Y.

The DirAC units 220 and/or 250 of the decoding device 200 may be modified such that they operate on at least the selected T/F tiles or frequency bands with a correspondingly reduced number of input signals. For the DirAC synthesis unit 220 this means that the number of used prototype signals is reduced accordingly. For the 1-channel example this means that the DirAC synthesis is based on a single (mono) prototype signal, for the 2-channel case, with W and Y input signals, the DirAC synthesizer may convert these signals to a left/right stereo representation from which prototype signals can be obtained. DirAC analysis (in the DirAC analysis and metadata generator unit 250) is typically not possible for these T/F tiles or frequency bands. Accordingly, for these T/F tiles or subbands DirAC metadata 104 should be calculated in the encoding device 100 and be transmitted within the encoder bit stream 106.

Hence, the decoding device 200 may be configured to perform only partial upmixing within the upmix unit 210, such that the output signal 201 of the upmix unit 210 (i.e., the intermediate Ambisonics signal 201) comprises less than $(L+1)^2$ channels. This partially upmixed intermediate Ambisonics signal 201 may be passed to the DirAC synthesis unit 220 for providing an output audio signal 211, e.g., a binaural or stereo output signal, for rendering. The partial upmixing may be performed for a subset of the plurality of T/F tiles or subbands. Alternatively, the partial upmixing may be performed for the complete set of T/F tiles or subbands. The option of performing partial upmixing may be used for increasing the perceptual audio quality of the output signal 211 at relatively low bit rates.

By way of example, the decoding device 200 may be configured to perform partial upmixing within the upmix unit 210, such that the output signal 201 of the upmix unit 210 is a stereo signal. Alternatively, or in addition, the decoding device 200 may be configured to put the DirAC synthesis unit 220 into a pass-through operation mode (where the DirAC synthesis unit 220 passes through the output signal 201 of the upmix unit 210, without modifying the output signal 201 and/or without performing an operation on the output signal 201). This allows the efficient generation of a stereo output signal 211 (e.g., for a multi-speaker system with 2 speakers).

The combined SPAR and DirAC encoding/decoding system 100, 200 may be configured to efficiently handle head-tracker input data to adjust (rotate) the output audio signal 211 in response to such data. In an example, the SPAR-reconstructed intermediate Ambisonics signal 201 of relatively low order (e.g., FOA) may be rotated (in accordance to the head-tracker data) before it is fed into the DirAC units 220, 250. This is especially numerically efficient if the DirAC analysis and metadata generation is exclusively based on the SPAR-reconstructed intermediate Ambisonics signal 201 available at the decoding device 200. A numerically less efficient alternative may be to rotate the higher order Ambisonics signal 211 after DirAC synthesis (in the DirAC synthesis unit 220). Even if DirAC metadata 104 is (partly) received from the encoding device 100, this metadata 104 (containing azimuth and elevation angles of the detected dominant sound directions) may be subjected to additional adjustments of the received angles based on the rotation angles which are obtained from the head-tracking device.

FIGS. 3*a* and 3*b* illustrate an example of a combined SPAR and DirAC encoding device 100 and a combined SPAR and DirAC decoding device 200. The encoding device 100 and/or decoding device 200 may be configured to switch between a SPAR encoder and a DirAC encoder in dependance of the bit rate. The encoding device 100 and decoding device 200 shown in FIGS. 3*a* and 3*b* do not allow providing the synergies which are described in the present document.

The encoding device 100 shown in FIG. 3*a* comprises a selection unit 300 which is configured to select a SPAR encoder branch or (alternatively) a DirAC encoder branch, in dependence of the (target) bit rate 301 of the encoder bit stream 106. By way of example, the SPAR encoder branch may be selected, if the bit rate 301 is equal to or smaller than a pre-determined bit rate threshold. On the other hand, the DirAC encoder branch may be selected, if the bit rate 301 is greater than the bit rate threshold. As a result of this, the encoder bit stream 106 comprises either bit streams 102, 105 from the SPAR encoder branch or bit streams 325, 104 from the DirAC encoder branch.

The DirAC encoder branch may comprise a downmix unit 321 which is configured to downmix the plurality of input channel signals of the Ambisonics input audio signal 101 to one or more transport channel signals 324. The one or more transport channel signals 324 may be encoded using an arbitrary (single-channel, dual-channel or multi-channel) waveform encoder 322, thereby providing a core audio bit stream 325.

FIG. 3*b* illustrates a corresponding decoding device 200 comprising a SPAR decoder branch and a separate DirAC decoder branch, which are both configured to generate an output signal which may be selected (in dependence of the bit rate 301 of the encoder bit stream 106), to provide the output signal 211 of the decoding device 200.

The SPAR decoder branch may comprise an optional rendering unit 320 which is configured to generate an alternative output signal 311 (different from the intermediate Ambisonics signal 201), such as a stereo signal or a binaural signal. A selection unit 371 may be provided to select between the intermediate Ambisonics signal 201 and the alternative output signal 311.

The DirAC decoder branch typically comprises a metadata decoding unit 340 which is configured to generate the DirAC metadata 304 from the DirAC metadata bit stream 104. Furthermore, the DirAC decoder branch may comprise a core decoder unit 342 configured to generate one or more reconstructed transport channel signals 344 (which correspond to the one or more transport channel signals 324) based on the core audio bit stream 325. The one or more reconstructed transport channel signal 344 and the DirAC metadata 304 may be used within the DirAC synthesis unit 360 to generate an output signal (e.g., an Ambisonics signal).

The DirAC decoder branch may further comprise a DirAC analyzer and metadata generator 350 (similar or equal to unit 350) which is configured to analyze the one or more reconstructed transport channel signals 344 to generate auxiliary DirAC metadata 354 that may be used in the DirAC synthesis unit 360 to generate the output signal (for rendering). The output signal of the DirAC synthesis unit 360 may be selected (using the selection units 372, 300) as overall output signal 211 of the decoding device 200.

In addition, the DirAC decoder branch may comprise an i-rendering unit 361 (or harmonized internal rendering unit) which is configured to generate an alternative output signal (as an alternative to the output signal of the DirAC synthesis unit 360). The alternative output signal may be a binaural signal or a stereo signal (as an alternative to an Ambisonics signal). The rendering unit 361 may be configured to generate the alternative output signal based on the DirAC metadata 304, the auxiliary DirAC metadata 354 and/or the reconstructed transport channel signals 344. The rendering unit 361 may be comprised within the DirAC synthesis unit 220 of the decoding device 200 in FIG. 2.

It should be noted that one or more of the components of the encoding device 100 of FIG. 3*a* may be used within the encoding device 100 of FIG. 1. In a similar manner, one or more of the components of the decoding device 200 of FIG. 3*b* may be used within the decoding device 200 of FIG. 2 and/or 4.

In the encoding device 100 of FIG. 1, the SPAR waveform encoder may make use of an arbitrary core audio coding tool, notably for all bit rates. SPAR may run in combination with DirAC for all bit rates. DirAC decoding (within the DirAC synthesis unit 220) may rely on the SPAR-reconstructed intermediate Ambisonics signal 201 for all bit rates.

At relative low bit rates, for which the DirAC codec typically uses 1 or 2 transport channels, the combined SPAR/DirAC codec may be adapted to operate

- on certain frequency bands with one or two transport channels requiring DirAC operations at both encoder and decoder to reconstruct FOA signals; and/or
- on certain other frequency bands with 4 SPAR reconstruction signals of the FOA signals.

Hence, a FOA pass-through may be provided.

At certain (relatively low) bit rates, the combined SPAR/DirAC codec may be adapted to operate at least on certain frequency bands with SPAR reconstruction of an Ambisonics signal of lower order and to rely on DirAC to reconstruct the original Ambisonics order. Hence, a HOA pass-through may be provided.

DirAC may be used as a predominant tool for augmenting the spatial resolution of an audio signal based on lower order Ambisonics signals reconstructed by SPAR. In particular, a FOA and/or HOAn input audio signal 101 may be converted into an HOAm, binaural and/or LS (loudspeaker) signal, with the output Ambisonics order m being greater than the input Ambisonics order n.

Internal and/or external renderer options may be provided, e.g.

- an internal renderer performing equivalently to an (assumed) reference renderer for subjective evaluations with reference tests;
- an internal renderer not causing additional latency; and/or
- an external renderer providing advanced features that cannot be tested in a reference test against a reference renderer. The renderer may provide improved pass-through performance.

The combined SPAR/DirAC codec described herein can be configured to be backward compatible with standalone SPAR codecs and DirAC codecs. In particular, the original SPAR operation can be maintained, if the decoder-side DirAC synthesis module is put in pass-through operation mode. Furthermore, the original DirAC operation may be maintained, if the SPAR modules are put in pass-through operation mode (e.g., by setting the SPAR prediction coefficients to zero).

By providing a FOA pass-through, a strictly increasing quality vs bit rate behavior may be achieved. By providing a HOA pass-through, the codec may achieve the performance of a pure SPAR encoder for HOA signals. The use of DirAC allows the efficient generation of HOA content (e.g., with HOA4 resolution). The combined SPAR/DirAC system performs in a particularly efficient manner at low bit rates, since it may rely on the active downmix channel W* that may be produced in the SPAR encoding modules.

As outlined above, SPAR and/or DirAC processing is typically performed in different subbands and/or T/F files. One or more different types of filter banks (FB) may be used for this purpose. By way of example, a first type of filter bank referred to as FB_A may be used. FB_A may be a QMF (quadrature mirror filter) filter bank, in particular a Complex Low Delay Filter bank (CLDFB). FB_A may comprise 60 channels, which may be grouped into a set of subbands. A second type of filter bank may be referred to as FB_B. FB_B may be a Nyquist filter bank which comprises the application of a Modified DFT (Discrete Fourier Transform), wherein the different bins of the Modified DFT may be grouped into a set of subbands. The filter banks may be applied to the time domain signals with a certain overlap (e.g., 1 ms overlap), in order to avoid block effects. FB_A (analysis plus synthesis) may exhibit a delay of 2.5 to 5 ms and/or FB_B (analysis plus synthesis) may exhibit a delay of 2 ms.

In a first example, the downmix unit 110 of the SPAR encoder 110, 130 may make use of FB_B analysis for generating the SPAR metadata bit stream 102, and of FB_B synthesis for generating the one or more downmix channel signals 103. Furthermore, the DirAC analyzer and metadata encoder 120 may make use of FB_A analysis. On the decoder side, the SPAR upmix unit 210 may make use of FB_B analysis and FB_B synthesis for generating the intermediate (Ambisonics) signal 201. Furthermore, the DirAC units 220, 250 may make use of FB_A analysis on the intermediate (Ambisonics) signal 201 and FB_A synthesis (subsequent to DirAC processing) to generate the output signal 211.

The FB_B analysis may be performed at the input of the downmix unit 110 of the SPAR encoder 110, 130, and the FB_B synthesis may be performed at an output of the downmix unit 110 of the SPAR encoder 110, 130 (at the output providing the one or more downmix channel signals 103). Furthermore, the FB_A analysis may be performed at the input of the DirAC analyzer and metadata encoder 120. Furthermore, the FB_B analysis may be performed at an input of the SPAR upmix unit 210 (at the input for the one or more reconstructed downmix channel signals 205), and the FB_B synthesis may be performed at the output of the SPAR upmix unit 210. Furthermore, FB_A analysis may be performed on the intermediate (Ambisonics) signal 201 (prior to entering the DirAC analysis and metadata generator unit 250 and/or the DirAC synthesis unit 220) and the FB_A synthesis processing may be performed at the output of the DirAC synthesis unit 220.

In a further example, the Ambisonics input audio signal 101 may be analyzed using FB_B (both for SPAR processing and DirAC processing, preferably prior to entering the downmix unit 110 of the SPAR encoder 110, 130 and/or the DirAC analyzer and metadata encoder 120). FB_B synthesis may be used to generate the one or more downmix channel signals 103 (at the output of the downmix unit 110 of the SPAR encoder 110, 130). The decoding device 200 may use the filter bank arrangement of the first example.

In a preferred example, FB_B (or alternatively FB_A) analysis may be used to analyze the Ambisonics input audio signal 101 (for SPAR and for DirAC processing, preferably prior to entering the downmix unit 110 of the SPAR encoder 110, 130 and/or the DirAC analyzer and metadata encoder 120). FB_B (or alternatively FB_A) synthesis may be used to generate the one or more downmix channel signals 103 (and may be performed at the output of the downmix unit 110 of the SPAR encoder 110, 130). On the decoder side, FB_A (or alternatively FB_B) analysis may be used to analyze the one or more reconstructed downmix channel signals 205 (at the input of the SPAR upmix unit 210). The intermediate (Ambisonics) signal 201 may be provided to the DirAC processing units 250, 220 within the filter bank domain, thereby removing the need for another filter bank operation. By doing this, the processing burden and the delay of the decoding device 200 may be reduced. FB_A (or alternatively FB_B) synthesis may be used at the output of the DirAC synthesis unit 220 to generate the output signal 211.

FIG. 5*a* shows a flow chart of an example method 500 for encoding an Ambisonics input audio signal 101. The Ambisonics input audio signal 101 comprises a plurality of different input channel signals, wherein the different channels may relate to different panning and/or spherical base functions and/or to different directivity patterns. By way of example, an $L^{th}$-order 3D Ambisonics signal may comprise $(L+1)^2$ channels. A First Order Ambisonics (FOA) signal is an Ambisonics signal of order L=1, and a Higher Order Ambisonics (HOA) signal is an Ambisonics signal of order L>1.

The method 500 comprises providing 501 the input audio signal 101 to a spatial reconstruction (SPAR) encoder 110, 130 and to a directional audio coding (DirAC) analyzer and parameter encoder 120 (in parallel).

The SPAR encoder 110, 130 may be configured to downmix the plurality of input channel signals of the Ambisonics input audio signal 101 within a subband and/or QMF domain to one or more downmix channel signals 103. Typically, the number of downmix channel signals 103 is smaller than the number of input channel signals. The one or more downmix channel signals 103 may be encoded by an (waveform) audio encoder 130, in order to provide an audio bit stream 105.

Furthermore, the SPAR encoder 110, 130 may be configured to generate a SPAR metadata bit stream 102 associated with a representation of the Ambisonics input audio signal 101 in the subband and/or QMF domain. The SPAR metadata bit stream 102 may be adapted for upmixing the one or more downmix channel signals 103 to a plurality of reconstructed channel signals of a reconstructed intermediate Ambisonics signal 201 (at the corresponding decoding device 200), wherein the plurality of reconstructed channel signals of the reconstructed intermediate Ambisonics signal 201 typically correspond (in a one-to-one relationship) to the plurality of input channel signals of the Ambisonics input audio signal 101.

For determining the SPAR metadata bit stream 102, the one or more downmix channel signals 103 may be transformed into the subband domain and/or may be processed within the subband domain. Furthermore, the plurality of input channel signals of the input audio signal 101 may be transformed into the subband domain (comprising subbands for a plurality of different frequency bands). Subsequently, the SPAR metadata bit stream 102 may be determined on a per subband basis (e.g., on a per frequency band basis and/or on a per time/frequency tile basis), notably such that by upmixing a subband signal of the one or more downmix channel signals 103 using the SPAR metadata bit stream 102, an approximation of a subband signal of the plurality of input channel signals of the input audio signal 101 is obtained. The SPAR metadata for the different subbands (i.e., for the different frequency band and/or for the different time/frequency tiles) may be combined to form the SPAR metadata bit stream 102.

The DirAC analyzer and parameter encoder 120 may be configured to perform a direction of arrival analysis (DoA) on the Ambisonics input audio signal 101 within a subband and/or QMF domain to determine a DirAC metadata bit stream 104 which is indicative of the direction of arrival of one or more predominant components of the Ambisonics input audio signal 101. The DirAC metadata bit stream 104 may be indicative of the spatial direction of the one or more predominant components of the Ambisonics input audio signal 101. The DirAC metadata 104, in particular the spatial direction of one or more predominant components, may be generated for a plurality of different frequency bands and/or for a plurality of different time/frequency tiles.

The method 500 further comprises generating 502 an encoder bit stream 106 based on output 102, 105 of the SPAR encoder 110, 130 and based on output 104 of the DirAC analyzer and parameter encoder 120. The DirAC analyzer may be configured to perform direction of arrival (DoA) analysis and/or diffuseness analysis. In other words, DirAC analysis may comprise DoA analysis and/or diffuseness analysis. As indicated above, the output 102, 105 of the SPAR encoder 110, 130 may comprise a SPAR metadata bit stream 102 and an audio bit stream 105 indicative of the set of SPAR downmix channel signals 103. The output 104 of the DirAC analyzer and parameter encoder 120 may comprise a DirAC metadata bit stream 104. Generating 502 the encoder bit stream 106 may comprise multiplexing the SPAR metadata bit stream 102, the audio bit stream 105 and the DirAC metadata bit stream 104 into the common encoder bit stream 106. A representation of the encoder bit stream 106 may be transmitted (in particular to a decoding device 200) and/or stored.

Hence, a method 500 is described which makes use of SPAR encoding and DirAC encoding jointly for providing a particularly efficient Ambisonics audio encoder having an increased perceptual quality. In the context of method 500, the data which is provided by the DirAC coding scheme may be limited to the DirAC metadata. On the other hand, the one or more transport channels of the DirAC coding scheme may be replaced by the data which is provided by the SPAR coding scheme (notably the one or more downmix channel signals and/or the SPAR metadata).

The method 500 may comprise generating subband data within a plurality of frequency bands and/or a plurality of time/frequency tiles, wherein the subband data represents the input audio signal 101. For this purpose, a QMF and/or subband filter bank may be used.

Furthermore, the method 500 may comprise selecting a subset of the plurality of frequency bands and/or of the plurality of time/frequency tiles. The subset of frequency bands and/or time/frequency tiles may correspond to a frequency range of frequencies at or above a pre-determined threshold frequency. This may be used to enable operation selectively based on SPAR metadata for one (lower) frequency range and operation based on DirAC metadata. 104 for another (higher) frequency range.

Alternatively, or in addition, property information regarding a property of the input audio signal 101, in particular a property with regards to a noise like or a tonal character of the input audio signal 101, may be determined (e.g., by analyzing the input audio signal 101). The subset of frequency bands and/or time/frequency tiles may then be selected based on the property information. In particular, the threshold frequency of the frequency range of the selected subset of frequency bands and/or time/frequency tiles may be determined based on the property information.

The output 104 of the DirAC analyzer and parameter encoder 120, in particular the DirAC metadata bit stream 104, may then be determined for the selected subset of frequency bands and/or time/frequency tiles, in particular for the selected subset of frequency bands and/or time/frequency tiles only.

In other words, the DirAC metadata may be determined at the encoding device 100 only for a reduced subset of the total plurality of frequency bands and/or the total plurality of time/frequency tiles, in particular for the frequency bands and/or time/frequency tiles which do not have tonal character and/or which have noise like character, and/or for the upper frequency bands and/or time/frequency tiles (which are at or above a certain threshold frequency). By doing this, a particularly efficient and high quality Ambisonics coding scheme may be provided.

As indicated above, SPAR processing and/or DirAC processing are typically performed within the subband and/or filter bank domain. The method 500 may comprise generating subband data within a plurality of frequency bands and/or a plurality of time/frequency tiles, which represents the input audio signal 101. The subband data may be generated using an analysis filter bank. The subband data may then be provided to the SPAR encoder 110, 130 for generating SPAR metadata bit stream 102 and to the DirAC analyzer and parameter encoder 120 for generating DirAC metadata 104.

Hence, a single analysis filter bank may be used to transform the input audio signal 101 into the filter bank domain. The input 101 signal may be represented within the filter bank domain by coefficients and/or samples for different subbands (i.e., by subband data). This subband data may be used as the basis for SPAR processing and for DirAC processing, thereby providing a particularly efficient encoding device 100.

The method 500 may comprise using a synthesis filter bank to generate one or more downmix channel signals 103 within the SPAR encoder 110, 130. The analysis filter bank and the synthesis filter bank may form a (possibly perfect reconstruction) analysis/synthesis filter bank. The one or more downmix channel signals 103 may be time domain signals which are encoded within the core audio encoder 130.

Hence, a single analysis/synthesis filter bank (e.g., a Nyquist or a QMF filter bank) may be used within the encoding device 100 for performing SPAR processing and DirAC processing, thereby reducing the computational complexity of the encoding device 100 (without impacting the perceptual quality).

FIG. 5*b* shows a flow chart of an example (computer-implemented) method 510 for decoding an encoder bit stream 106 which is indicative of an Ambisonics input audio signal 101. The method 510 comprises generating 511 an intermediate Ambisonics signal 201 using a spatial reconstruction (SPAR) decoder 210, 230 based on the encoder bit stream 106. The intermediate Ambisonics signal 201 may have the same order L as the input audio signal 101. The intermediate Ambisonics signal 201 may be a time domain. signal. Alternatively, the intermediate Ambisonics signal 201 may be represented within a filter bank or subband domain.

A SPAR metadata bit stream 102 and an audio bit stream 105 may be extracted from the encoder bit stream 106. The intermediate Ambisonics signal 201 may then be generated from the SPAR metadata bit stream 102 and the audio bit stream 105 using the SPAR decoder 210, 230. In particular, a set of reconstructed downmix channel signals 205 may be generated from the audio bit stream 105 using an (waveform) audio decoder 230. Furthermore, the set of reconstructed downmix channel signals 205 may be upmixed to the intermediate Ambisonics signal 201 (comprising a plurality of (notably $(L+1)^2$ or less) intermediate channel signals) based on the SPAR metadata bit stream 102 using an upmix unit 210. The plurality of intermediate channel signals of the intermediate Ambisonics signal 201 typically is a reconstruction and/or an approximation of the plurality of input channel signals of the Ambisonics input audio signal 101 or a subset thereof.

Furthermore, the method 500 comprises processing 512 the intermediate Ambisonics signal 201 using a directional audio coding (DirAC) synthesizer 220 (also referred to as a DirAC synthesis unit) to provide an output audio signal 211 for rendering. The output signal 211 may comprise at least one of an Ambisonics output signal, a binaural output signal, a stereo or a multi-loudspeaker output signal. In particular, a DirAC metadata bit stream 104 may be extracted from the encoder bit stream 106. The intermediate Ambisonics signal 201 may be processed in dependance of the DirAC metadata bit stream 104 using the DirAC synthesizer 220 to provide the output audio signal 211.

As indicated above, the intermediate Ambisonics signal 201 may be represented in the time domain. In this case, DirAC processing may comprise the application of an analysis filter bank to transform the intermediate Ambisonics signal 201 into the filter bank domain. In a preferred example, the intermediate Ambisonics signal 201 (which is provided by SPAR processing) is already represented within the filter bank domain. By doing this, the application of a synthesis filter bank (within SPAR processing) and the application of a subsequent analysis filter bank (within DirAC processing) may be removed, thereby increasing the computational efficiency and the perceptual quality of the decoding device 200.

Hence, a decoding method 510 is described which makes use of a SPAR decoding subsequently followed by a DirAC synthesizing operation (and possibly a DirAC analyzing operation). The SPAR decoding may be used to provide one or more transport channels (notably the intermediate Ambisonics signal 201) in an efficient and high quality manner. The DirAC synthesizer may be used to provide one or more different types of output signals 211 for rendering an audio signal in a flexible manner. In this context, DoA data of one or more predominant components of the input audio signal 101 (comprised within the DirAC metadata) may be used to generate the output signal 211.

The DirAC metadata may be provided (at least partly) within the encoder bit stream 106. Alternatively, or in addition, the DirAC metadata may be generated (at least partly) at the decoding device 200.

Hence, the method 510 may comprise processing the intermediate Ambisonics signal 201 within a DirAC analyzer 250 (i.e. within the DirAC analysis and metadata generator unit 250) to generate auxiliary DirAC metadata 204. In this context, a DoA analysis may be performed to determine auxiliary DirAC metadata 204 which is indicative of the DoA of one or more predominant components of the intermediate Ambisonics signal 201.

The intermediate Ambisonics signal 201 may then be processed in dependance of the auxiliary DirAC metadata 204 using the DirAC synthesizer 220 to provide the output audio signal 211. By making use of DirAC metadata which has been determined at the decoding device 200, the efficiency of the Ambisonics codec may be further improved.

As indicated above, the (SPAR and/or DirAC) metadata is typically generated for a plurality of different frequency bands and/or time/frequency tiles. The codec may be configured to generate the DirAC metadata for some of the different frequency bands and/or time/frequency tiles at the encoding device 100 and for some others of the different frequency bands and/or time/frequency tiles at the decoding device 200 (in particular, in a complimentary and/or mutually exclusive manner). By doing this, the efficiency and the quality of the Ambisonics codec may be further improved.

The method 510 may comprise generating subband data within a plurality of frequency bands and/or a plurality of time/frequency tiles (e.g., using a subband transform and/or a QMF filter bank), wherein the subband data represents the intermediate Ambisonics signal 201 (within the filter bank or subband domain). Furthermore, the method 510 may comprise selecting a subset of the plurality of frequency bands and/or the plurality of time/frequency tiles.

A subset of frequency bands and/or time/frequency tiles may be selected which corresponds to a frequency range of frequencies at or below a pre-determined threshold frequency.

Alternatively, or in addition, property information regarding a property of the input audio signal 101 and/or of the intermediate Ambisonics signal 201, in particular a property with regards to a noise like or a tonal character of the input audio signal 101 and/or of the intermediate Ambisonics signal 201, may be determined, e.g., by analyzing the intermediate Ambisonics signal 201. The subset of frequency bands and/or time/frequency tiles may then be determined based on the property information. In particular, the threshold frequency for selecting the subset may be determined based on the property information.

The method 510 may further comprise determining, based on the subband data, the auxiliary DirAC metadata 204 for the selected subset of frequency bands and/or time/frequency tiles, in particular for the selected subset of frequency bands and/or time/frequency tiles only.

Hence, auxiliary DirAC metadata 204 may be generated for a reduced subset of frequency bands and/or time/frequency tiles directly at the decoding device 200 (without the need of transmitting DirAC metadata for these frequency bands and/or time/frequency tiles). This may be the case for low frequency bands. By doing this, the efficiency of the Ambisonics codec may be further increased.

The method 510 may comprise determining orientation data regarding the (spatial) orientation of the head of a listener (within a listening environment), in particular using a head-tracking device. A rotation operation may be performed on the intermediate Ambisonics signal 201 in dependence of the orientation data, to generate a rotated Ambisonics signal. Hence, the intermediate Ambisonics signal may be rotated to account for the orientation of the head of the listener in a resource efficient manner. Furthermore, the auxiliary DirAC metadata may be generated based on the rotated Ambisonics signal (instead of the non-rotated intermediate Ambisonics signal).

The rotated intermediate Ambisonics signal 201 may then be processed using the DirAC synthesizer 220 to provide the (rotated) output audio signal 211 for rendering to the listener. By doing this, head rotations may be taken into account in an efficient and precise manner.

As indicated above, a DirAC metadata bit stream (i.e., the DirAC metadata) 104 may be extracted from the encoder bit stream 106. The method 510 may comprise performing a rotation operation on the DirAC metadata bit stream (i.e., on the DirAC metadata) 104 in dependence of the orientation data, to generate a rotated DirAC metadata bit stream (i.e., rotated DirAC metadata). The intermediate Ambisonics signal 201 or an Ambisonics signal derived therefrom (notably the rotated Ambisonics signal) may then be processed in dependance of the rotated DirAC metadata bit stream (i.e., on the rotated DirAC metadata) using the DirAC synthesizer 220 to provide the output audio signal 211 for rendering to the listener. By doings this, head rotations may be taken into account in an efficient and precise manner.

The method 510 may comprise generating an Ambisonics output signal 211 from the intermediate Ambisonics signal 201 using the DirAC synthesizer 220. For this purpose, the DirAC metadata bit stream 104 (from the encoder bit stream 106) and/or the auxiliary DirAC metadata 204 (generated at the decoding device 200) may be used. The Ambisonics output signal 211 may have an Ambisonics order L which is greater than the Ambisonics order of the input audio signal 101 and/or of the intermediate Ambisonics signal 201. By doing this, the quality and flexibility of Ambisonics audio rendering may be improved in an efficient manner.

As indicated above, the method 510 may comprise extracting an audio bit stream 105 from the encoder bit stream 106 and generating a set of reconstructed downmix channel signals 205 from the audio bit stream 105 using an (core) audio decoder 230. In other words, a set of reconstructed downmix channel signals 205 may be derived from the encoder bit stream 106.

The method 510 may further comprise applying an analysis filter bank to the set of reconstructed downmix channel signals 205 to transform the set of reconstructed downmix channel signals 205 (from the time domain) into the filter bank domain. The analysis filter bank may be configured to transform the one or more different reconstructed downmix channel signals 205 into different frequency channels or frequency bins, which may be grouped into a set of subbands. The one or more different reconstructed downmix channel signals 205 may be represented within the filter bank domain as samples and/or coefficients for the different subbands.

In addition, the method 510 may comprise generating 511 an intermediate Ambisonics signal 201 which is represented in the filter bank domain, based on the set of reconstructed downmix channel signals 205 in the filter bank domain. For this purpose, an upmixing operation (using the SPAR metadata bit stream 102) may be performed. The intermediate Ambisonics signal 201 may be represented within the filter bank domain as samples and/or coefficients for the different subbands.

The method 510 may further comprise processing 512 the intermediate Ambisonics signal 201 which is represented in the filter bank domain using the DirAC synthesizer 220. Hence, the DirAC synthesizer 220 (and possibly the DirAC analyzer 250) may directly operate on the intermediate Ambisonics signal 201 which is represented in the filter bank domain (without the need of performing another filter bank operation). By doing this, the DirAC metadata 104, 204 (which is already represented in the filter bank domain) may be directly applied to the intermediate Ambisonics signal 201 which is represented in the filter bank domain.

Hence, the decoding device 200 may make use of a single analysis filter bank for transforming the one or more reconstructed downmix signals 205 into the filter bank domain. Subsequently, SPAR upmixing and/or DirAC processing may be provided directly in the same filter bank domain. By doing this, a particularly efficient decoding device 200 may be provided. Furthermore, the audio quality of the decoding device 200 may be improved.

The method 510 may further comprise processing 512 the intermediate Ambisonics signal 201 which is represented in the filter bank domain using the DirAC synthesizer 220 to generate an output signal 211 which is represented in the filter bank domain. As indicated above, DirAC synthesis may be performed directly within the filter bank domain of the analysis filter bank that is applied to the one or more reconstructed downmix signals 205, thereby generating an output signal 211 within this filter bank domain. The output signal 211 may be represented within the filter bank domain as samples and/or coefficients for the different subbands of the filter bank domain.

In addition, the method 510 may comprise applying a synthesis filter bank to the output signal 211 which is represented in the filter bank domain, to generate an output signal 211 in the time domain. The analysis filter bank and the synthesis filter bank typically form a joint analysis/synthesis filter bank, in particular a perfect reconstruction analysis/synthesis filter bank. By way of example, the analysis filter bank and the synthesis filter bank may be Nyquist filter banks or QMF (quadrature mirror filter) filter banks.

The encoder bit stream 106 may have been generated using a first type of filter bank, in particular a Nyquist filter bank. The analysis filter bank (used at the decoding device 200) may be a filter bank of a second type, in particular a QMF filter bank, which is different from the first type. The frequency band boundaries of the first type of filter bank are preferably adjusted to and/or aligned with corresponding frequency band boundaries of the second type of filter bank.

Hence, different types of analysis/synthesis filter banks may be used at the encoding device 100 and at the decoding device 200. By doing this, the perceptual quality of the overall codec may be further improved, while keeping the latency of the codec as low as possible.

The intermediate Ambisonics signal 201 (within the time domain or within the filter bank domain) may comprise less channels than the original Ambisonics input audio signal 101. In other words, the SPAR decoder 210, 230 may be used to perform (only) a partial upmixing operation to generate an intermediate Ambisonics signal 201 which comprises less channels than the Ambisonics input audio signal 101.

The partial upmixing operation may be performed in the filter bank domain with a plurality of subbands and/or a plurality of time/frequency tiles. The intermediate Ambisonics signal 201 may comprise less channels than the Ambisonics input audio signal 101 for all of the plurality of subbands and/or for all of the plurality of time/frequency tiles. Alternatively, the intermediate Ambisonics signal 201 may comprise less channels than the Ambisonics input audio signal 101 for only a subset of the plurality of subbands and/or the plurality of time/frequency tiles.

Hence, the decoding device 200 may be configured to cause the SPAR decoder 210, 230 to generate only a subset of channels of the original Ambisonics input audio signal 101, e.g., in cases where the bit rate of the encoder bit stream 106 is equal to or smaller than a pre-determined bit rate threshold (e.g., 64 kbs). This subset of channels may then be used within the DirAC synthesis 220 to generate an output signal 211. By doing this, the audio quality may be increased (at relatively low bit rates), while reducing the numerical complexity and memory requirements of the decoder operations.

The decoding device 200 may be configured to put the DirAC synthesizer 220 into a pass-through operation mode and/or to bypass the DirAC synthesizer 220. This may be done such that the intermediate Ambisonics signal 201 corresponds to the output audio signal 211 for rendering (wherein the intermediate Ambisonics signal 201 may e.g., correspond to a stereo signal, e.g., due to a partial upmixing operation). By doing this, a stereo output may be provided in an efficient manner.

It should be noted that the terms "metadata" and "metadata bit stream" are used within the present document in an interchangeable manner, such that if reference is made to "metadata", this may (also) refer to a "metadata bit stream", and/or if reference is made to a "metadata bit stream", this may (also) refer to "metadata".

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof. One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics.

Computer-readable media in which such formatted data and/or instructions may be embodied include, but are not limited to, physical (non-transitory), non-volatile storage media in various forms, such as optical, magnetic or semi-conductor storage media.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Various aspects and implementations of the present invention may also be appreciated from the following enumerated example embodiments (EEEs), which are not claims.

EEE1. A method (500) for encoding an Ambisonics input audio signal (101); the method (500) comprising, providing (501) the input audio signal (101) to a SPAR encoder (110, 130) and to a DirAC analyzer and parameter encoder (120); and generating (502) an encoder bit stream (106) based on output (102, 105) of the SPAR encoder (110, 130) and based on output (104) of the DirAC analyzer and parameter encoder (120).

EEE2. The method (500) of EEE1, wherein the output (102, 105) of the SPAR encoder (110, 130) comprises a SPAR metadata bit stream (102) and an audio bit stream (105) indicative of a set of SPAR downmix channel signals (103); and/or the output (104) of the DirAC analyzer and parameter encoder (120) comprises a DirAC metadata bit stream (104).

EEE3. The method (500) of EEE2, wherein generating (502) the encoder bit stream (106) comprises multiplexing the SPAR metadata bit stream (102), the audio bit stream (105) and the DirAC metadata bit stream (104) into the common encoder bit stream (106).

EEE4. The method (500) of any previous EEE, further comprising transmitting a representation of the encoder bit stream (106), in particular to a decoding device (200), and/or storing a representation of the encoder bit stream (106).

EEE5. The method (500) of any previous EEE, wherein the method (500) comprises, generating subband data within a plurality of frequency bands and/or a plurality of time/frequency tiles, which represents the input audio signal (101);

selecting a subset of the plurality of frequency bands and/or the plurality of time/frequency tiles; and determining, based on the subband data, an output (104) of the DirAC analyzer and parameter encoder (120), in particular a DirAC metadata bit stream (104), for the selected subset of frequency bands and/or time/frequency tiles, in particular for the selected subset of frequency bands and/or time/frequency tiles only.

EEE6. The method (500) of EEE5, wherein the method (500) comprises, determining property information regarding a property of the input audio signal (101), in particular a property with regards to a noise like or a tonal character of the input audio signal (101); and selecting the subset of frequency bands and/or time/frequency tiles based on the property information.

EEE7. The method (500) of any of EEE5 to EEE6, wherein the subset of frequency bands and/or time/frequency tiles corresponds to a frequency range of frequencies at or above a pre-determined threshold frequency.

EEE8. The method (500) of any of the previous EEEs, wherein the method (500) comprises, generating subband data within a plurality of frequency bands and/or a plurality of time/frequency tiles, which represents the input audio signal (101), using an analysis filter bank; and providing the subband data to the SPAR encoder (110, 130) for generating SPAR metadata (102) and to the DirAC analyzer and parameter encoder (120) for generating DirAC metadata (104).

EEE9. The method (500) of EEE8, wherein the method (500) comprises, using a synthesis filter bank to generate one or more downmix channel signals (103) within the SPAR encoder (110, 130).

EEE10. A method (510) for decoding an encoder bit stream (106) which is indicative of an Ambisonics input audio signal (101); the method (510) comprising, generating (511) an intermediate Ambisonics signal (201) using a SPAR decoder (210, 230) based on the encoder bit stream (106); and processing (512) the intermediate Ambisonics signal (201) using a DirAC synthesizer (220) to provide an output audio signal (211) for rendering.

EEE11. The method (510) of EEE10, wherein the method (510) comprises, extracting a SPAR metadata bit stream (102) and an audio bit stream (105) from the encoder bit stream (106); and generating the intermediate Ambisonics signal (201) from the SPAR metadata bit stream (102) and the audio bit stream (105) using the SPAR decoder (210, 230).

EEE12. The method (510) of EEE11, wherein the method (510) comprises, generating a set of reconstructed downmix channel signals (205) from the audio bit stream (105) using an audio decoder (230); and upmixing the set of reconstructed downmix channel signals (205) to the intermediate Ambisonics signal (201) based on the SPAR metadata bit stream (102) using an upmix unit (210).

EEE13. The method (510) of any of EEE10 to EEE12, wherein the method (510) comprises, extracting a DirAC metadata bit stream (104) from the encoder bit stream (106); and processing (512) the intermediate Ambisonics signal (201) in dependance of the DirAC metadata bit stream (104) using the DirAC synthesizer (220) to provide the output audio signal (211).

EEE14. The method (510) of any of EEE10 to EEE13, wherein the method (510) comprises, processing the intermediate Ambisonics signal (201) within a DirAC analyzer (250) to generate auxiliary DirAC metadata (204); and processing (512) the intermediate Ambisonics signal (201) in dependance of the auxiliary DirAC metadata (204) using the DirAC synthesizer (220) to provide the output audio signal (211).

EEE15. The method (510) of EEE14, wherein the method (510) comprises generating subband data within a plurality of frequency bands and/or a plurality of time/frequency tiles, which represents the intermediate Ambisonics signal (201);

selecting a subset of the plurality of frequency bands and/or the plurality of time/frequency tiles; and determining, based on the subband data, the auxiliary DirAC metadata (204) for the selected subset of frequency bands and/or time/frequency tiles, in particular for the selected subset of frequency bands and/or time/frequency tiles only.

EEE16. The method (510) of EEE15, wherein the method (510) comprises, determining property information regarding a property of the input audio signal (101) and/or of the intermediate Ambisonics signal (201), in particular a property with regards to a noise like or a tonal character of the input audio signal (101) and/or of the intermediate Ambisonics signal (201); and selecting the subset of frequency bands and/or time/frequency tiles based on the property information.

EEE17. The method (510) of any of EEE15 to EEE16, wherein the subset of frequency bands and/or time/frequency tiles corresponds to a frequency range of frequencies at or below a pre-determined threshold frequency.

EEE18. The method (510) of any of EEE10 to EEE17, wherein the method (510) comprises generating an Ambisonics output signal (211) from the intermediate Ambisonics signal (201) using the DirAC synthesizer (220) having an Ambisonics order which is greater than an Ambisonics order of the input audio signal (101) and/or of the intermediate Ambisonics signal (201).

EEE19. The method (510) of any of EEE10 to EEE18, wherein the output signal (211) comprises at least one of an Ambisonics output signal, a binaural output signal, a stereo or a multi-loudspeaker output signal.

EEE20. The method (510) of any of EEE10 to EEE19, wherein the method (510) comprises, determining orientation data regarding an orientation of a head of a listener, in particular using a head-tracking device;

performing a rotation operation on the intermediate Ambisonics signal (201) in dependence of the orientation data, to generate a rotated Ambisonics signal; and processing the rotated Ambisonics signal using the DirAC synthesizer (220) to provide the output audio signal (211) for rendering to the listener.

EEE21. The method (510) of any of EEE10 to EEE20, wherein the method (510) comprises, determining orientation data regarding an orientation of a head of a listener, in particular using a head-tracking device;

extracting DirAC metadata (104) from the encoder bit stream (106);

performing a rotation operation on the DirAC metadata (104) in dependence of the orientation data, to generate rotated DirAC metadata; and processing the intermediate Ambisonics signal (201) or an Ambisonics signal derived therefrom in dependance of the rotated DirAC metadata using the DirAC synthesizer (220) to provide the output audio signal (211) for rendering to the listener.

EEE22. The method (510) of any of EEE10 to EEE21, wherein the intermediate Ambisonics signal (201) comprises less channels than the Ambisonics input audio signal (101); and/or the SPAR decoder (210, 230) is used to perform a partial upmixing operation to generate an intermediate Ambisonics signal (201) which comprises less channels than the Ambisonics input audio signal (101).

EEE23. The method (510) of EEE22, wherein the partial upmixing operation is performed in a filter bank domain with a plurality of subbands and/or a plurality of time/frequency tiles; and the intermediate Ambisonics signal (201) comprises less channels than the Ambisonics input audio signal (101) for all of the plurality of subbands and/or for all of the plurality of time/frequency tiles; or the intermediate Ambisonics signal (201) comprises less channels than the Ambisonics input audio signal (101) for only a subset of the plurality of subbands and/or the plurality of time/frequency tiles.

EEE24. The method (510) of any of EEE10 to EEE22, wherein the method (510) comprises, extracting an audio bit stream (105) from the encoder bit stream (106);

generating a set of reconstructed downmix channel signals (205) from the audio bit stream (105) using an audio decoder (230);

applying an analysis filter bank to the set of reconstructed downmix channel signals (205) to transform the set of reconstructed downmix channel signals (205) into a filter bank domain;

generating (511) an intermediate Ambisonics signal (201) which is represented in the filter bank domain, based on the set of reconstructed downmix channel signals (205) in the filter bank domain; and processing (512) the intermediate Ambisonics signal (201) which is represented in the filter bank domain using the DirAC synthesizer (220).

EEE25. The method (510) of EEE24, wherein the method (510) comprises, processing (512) the intermediate Ambisonics signal (201) which is represented in the filter bank domain using the DirAC synthesizer (220) to generate an output signal (211) which is represented in the filter bank domain; and applying a synthesis filter bank to the output signal (211) which is represented. in the filter bank domain to generate an output signal (211) in the time domain.

EEE26. The method (510) of EEE25, wherein the analysis filter bank and the synthesis filter bank form a joint analysis/synthesis filter bank, in particular a perfect reconstruction analysis/synthesis filter bank; and/or the analysis filter bank and the synthesis filter bank are Nyquist filter banks or QMF filter banks.

EEE27. The method (510) of any of EEE24 to EEE26, wherein the encoder bit stream (106) has been generated using a first type of filter bank, in particular a Nyquist filter bank; and the analysis filter bank is filter bank of a second type, in particular a QMF filter bank, which is different from the first type.

EEE28. The method (510) of EEE27, wherein frequency band boundaries of the first type of filter bank are adjusted to corresponding frequency band boundaries of the second type of filter bank.

EEE29. A system comprising:

one or more processors; and a non-transitory computer-readable medium storing instructions that, upon execution by the one or more processors, cause the one or more processors to perform operations of any of the previous EEEs.

EEE30. A non-transitory computer-readable medium storing instructions that, upon execution by one or more processors, cause the one or more processors to perform operations of any of EEE1 to EEE28.

EEE31. An encoding device (100) for encoding an Ambisonics input audio signal (101); wherein the encoding device (100) is configured to provide the input audio signal (101) to a SPAR encoder (110, 130) and to a DirAC analyzer and parameter encoder (120); and generate an encoder bit stream (106) based on output (102, 105) of the SPAR encoder (110, 130) and based on output (104) of the DirAC analyzer and parameter encoder (120).

EEE32. The encoding device (100) of EEE31, wherein the Ambisonics input audio signal (101) comprises a plurality of input channel signals, and wherein the SPAR encoder (110, 130) is configured to downmix the plurality of input channel signals within a subband and/or QMF domain into one or more downmix channel signals (103); and generate a SPAR metadata bit stream (102) within the subband and/or QMF domain, adapted for upmixing the one or more downmix channel signals (103) to a plurality of reconstructed channel signals of a reconstructed Ambisonics signal (201).

EEE33. The encoding device (100) of any of EEE31 to EEE32, wherein the DirAC analyzer and parameter encoder (120) is configured to perform a direction of arrival analysis on the Ambisonics input audio signal (101) within a subband and/or QMF domain to determine a DirAC metadata bit stream (104) which is indicative of the direction of arrival of one or more predominant components of the Ambisonics input audio signal (101).

EEE34. A decoding device (200) for decoding an encoder bit stream (106) which is indicative of an Ambisonics input audio signal (101); wherein the decoding device (200) is configured to generate an intermediate Ambisonics signal (201) using a SPAR decoder (210, 230) based on the encoder bit stream (106); and process the intermediate Ambisonics signal (201) using a DirAC synthesizer (220) to provide an output audio signal (211) for rendering.

EEE35. The decoding device (200) of EEE34, wherein the decoding device (200) is configured to put the DirAC synthesizer (220) into a pass-through operation mode; and/or bypass the DirAC synthesizer (220);

in particular such that the intermediate Ambisonics signal (201) corresponds to the output audio signal (211) for rendering.

The invention claimed is:

1. A method for encoding an Ambisonics input audio signal, the method comprising:

providing the input audio signal to a SPAR encoder and to a DirAC analyzer and parameter encoder; and generating an encoder bit stream based on output of the SPAR encoder and based on output of the DirAC analyzer and parameter encoder.

* * * * *